(12) United States Patent
Greenberg

(10) Patent No.: US 8,968,810 B2
(45) Date of Patent: Mar. 3, 2015

(54) MOULD AND METHOD FOR PREPARING A DECORATIVE CAKE COATING

(76) Inventor: Rachel Greenberg, Petach Tikva (IL)

( * ) Notice: Subject to any disclaimer, the term of this patent is extended or adjusted under 35 U.S.C. 154(b) by 808 days.

(21) Appl. No.: 12/597,536

(22) PCT Filed: Apr. 29, 2008

(86) PCT No.: PCT/IL2008/000566
§ 371 (c)(1),
(2), (4) Date: Oct. 26, 2009

(87) PCT Pub. No.: WO2008/135970
PCT Pub. Date: Nov. 13, 2008

(65) Prior Publication Data
US 2010/0291273 A1 Nov. 18, 2010

Related U.S. Application Data

(60) Provisional application No. 61/916,304, filed on May 7, 2007.

(51) Int. Cl.
*A21D 13/00* (2006.01)
*A23G 3/02* (2006.01)
*A23L 1/00* (2006.01)

(52) U.S. Cl.
CPC ........ *A21D 13/0087* (2013.01); *A21D 13/0009* (2013.01); *A21D 13/0016* (2013.01)
USPC ............ 426/389; 426/512; 426/293; 426/289

(58) Field of Classification Search
CPC ....... A23G 9/221; A23G 3/0268; A23G 9/24; A23G 1/0076; A23G 1/0086; A23G 1/005; A23G 3/0029; A23G 9/18; A23P 1/105; A23P 1/10
USPC ........... 426/515, 512, 523, 89, 104, 249, 291, 426/292, 282, 389, 293; 249/69–72, 92, 249/102–104, 119–123
See application file for complete search history.

(56) References Cited

U.S. PATENT DOCUMENTS

| | | |
|---|---|---|
| 4,480,974 A | 11/1984 | Akutagawa |
| 2003/0215554 A1 | 11/2003 | Mccarrick |

(Continued)

FOREIGN PATENT DOCUMENTS

| | | |
|---|---|---|
| EP | 1362515 | 11/2003 |
| GB | 2321213 | 7/1998 |

(Continued)

OTHER PUBLICATIONS

Webpage: Sugarcraft.com cached Dec. 2004.*

(Continued)

*Primary Examiner* — Viren Thakur
*Assistant Examiner* — Lela S Williams
(74) *Attorney, Agent, or Firm* — Edward Langer

(57) ABSTRACT

In one aspect, the present invention is directed to a method for preparing a decorative cake coating, the method comprising the steps of: providing a contour of a figure, the contour being made of a first edible solid substance, such as chocolate; filling the spaces between the lines of the contour with a second edible substance, such as colored candies; pouring dough made of a third edible substance (e.g., hot chocolate) onto the figure; and turning the coating upside down, thereby enabling placing the coating on the cake with the decorative figure on top.

9 Claims, 9 Drawing Sheets

(56) References Cited

U.S. PATENT DOCUMENTS

2006/0172042 A1    8/2006    Clemons
2006/0182856 A1*  8/2006    Ornelaz, Jr. .................. 426/383

FOREIGN PATENT DOCUMENTS

JP    59120051    7/1984
JP    59130137    7/1984

OTHER PUBLICATIONS

Webpage: Google Groups, Hallow Chocolate Balls, dated Nov. 2001.*
Webpage: Chocolate Candy Mall, dated Jan. 2012.*
Internet Archive, Sugarcraft Dec. 2005 r http://www.sugarcraft.com/catalog/airbrush/kopyjetmolds.htm.*
Chocolate Making (http://web.archive.org/web/20070107175314/http://chocomap.com/chocolate-making-molds.php). 2007.*
The Eyes Have It (http://eyes-have.blogspot.com/2006/07/praline-truffle-or-just-plain.html). 2006.*
(http://www.slashfood.com/2006/07/28/food-porn-chocolate-truffle-layer-cake/). 2006.*
http://chowhound.chow.com/topics/276889. 2006.*

* cited by examiner

MOULD AND METHOD FOR PREPARING A DECORATIVE CAKE COATING

CROSS-REFERENCE TO RELATED APPLICATIONS

This application is a U.S. National Phase Application under 35 U.S.C. 371 of PCT International Application No. PCT/IL2008/000566 which has an international filing date of Apr. 29, 2008, and which claims priority from U.S. Provisional Patent Application No. 60/916,304, filed May 7, 2007, all of which disclosures are hereby incorporated by reference.

FIELD OF THE INVENTION

The present invention relates to the field of cake preparation. More particularly, the invention relates to a method for preparing a decorative cake coating which provides figures of a relatively-high quality.

BACKGROUND OF THE INVENTION

Decorating a cake to reflect personal touch and taste is a well known objective. For example, birthday cakes may be adorned with fruits, shaved chocolate, candles, and so forth. The text "Happy Birthday" may be added by a pre-manufactured plastic decoration, pouring chocolate, candies, and so on.

Nevertheless, there is no satisfactory technology for decorating a cake with figures such as of animals, text, etc.

It is an object of the present invention to provide a technology for decorating a cake with figures, and a method thereof.

Other objects and advantages of the invention will become apparent as the description proceeds.

SUMMARY OF THE INVENTION

The following embodiments and aspects thereof are described and illustrated in conjunction with systems, tools and methods, which are meant to be merely illustrative, not limiting in scope. In various embodiments, one or more of the above-described problems have been reduced or eliminated, while other embodiments are directed to other advantages or improvements.

In one aspect, the present invention is directed to a method for preparing a decorative cake coating, the method comprising the steps of;

provided a contour of a figure, the contour being made of an edible solid substance, such as chocolate;

filling the spaces between the lines of the contour with a second edible substance, such as colored candies;

pouring dough of a third edible substance onto the figure; and turning the coating upside down, thereby enabling placing the coating on the cake with the decorative figure on top.

Preferably, the figure comprises a frame.

Preferably, the height of the contour is more than 2 mm, thereby allowing the contour to be sufficiently massive for its role in the process of preparing the coating.

The third substance may be a substance which changes its aggregation state to solid at a certain temperature, such as room temperature, a refrigerator temperature, etc. For example, hot chocolate is a fluid which changes its aggregation state in room temperature. In this case the coating may be turned upside down when the third substance changes its aggregation state to solid.

The method may further comprise the step of placing grease layer between the contour and a pan thereof, such as a grease-proof paper, and margarine.

In another aspect, the present invention is directed to a mould for preparing a decorative cake coating, the mould comprising:

a substrate of a non-toxic substance, such as foamed plastic;

a contour of a figure, the contour being a slotted line in the substrate; and a solid substance filled into the slotted line.

The mould may further comprise a contour of a frame.

The size of the slotted line is at least of about 2 mm.

The mould may further comprise a pan, for protecting the mould from deformation until use.

The mould may further comprise a lid, for enabling turning the mould upside down.

The mould may further comprise a grease layer, for enabling "easy" separation of sticky parts.

In addition to the exemplary aspects and embodiments described above, further aspects and embodiments will become apparent by reference to the figures and by study of the following detailed description.

BRIEF DESCRIPTION OF THE DRAWINGS

The objects and features of the present invention will become apparent from the following detailed description considered in conjunction with the accompanying drawings, in which.

Each of FIGS. 4a to 4g schematically illustrates a step in cake preparation, according to one embodiment of the invention.

Figure 5A:
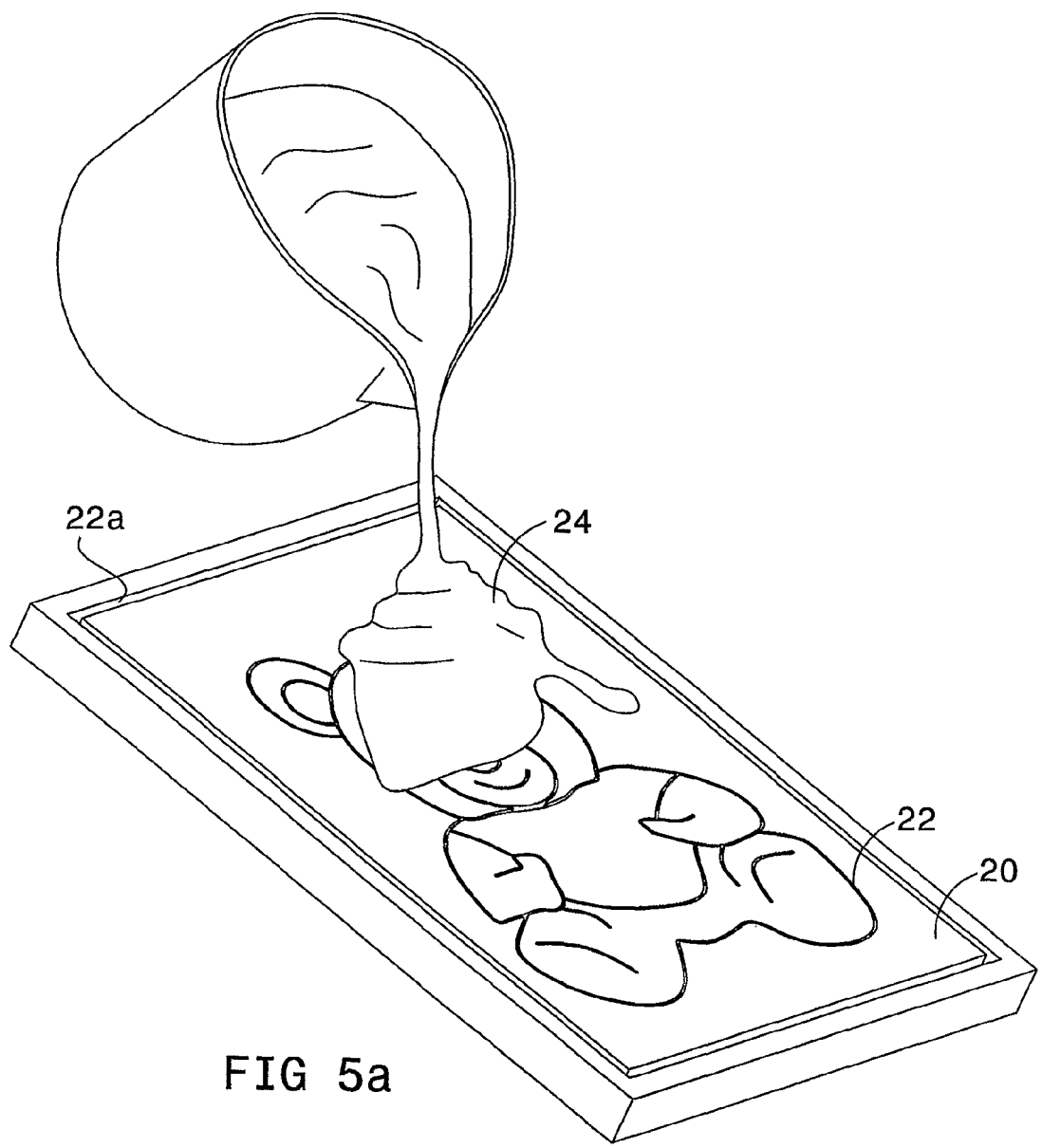
Figure 5B:
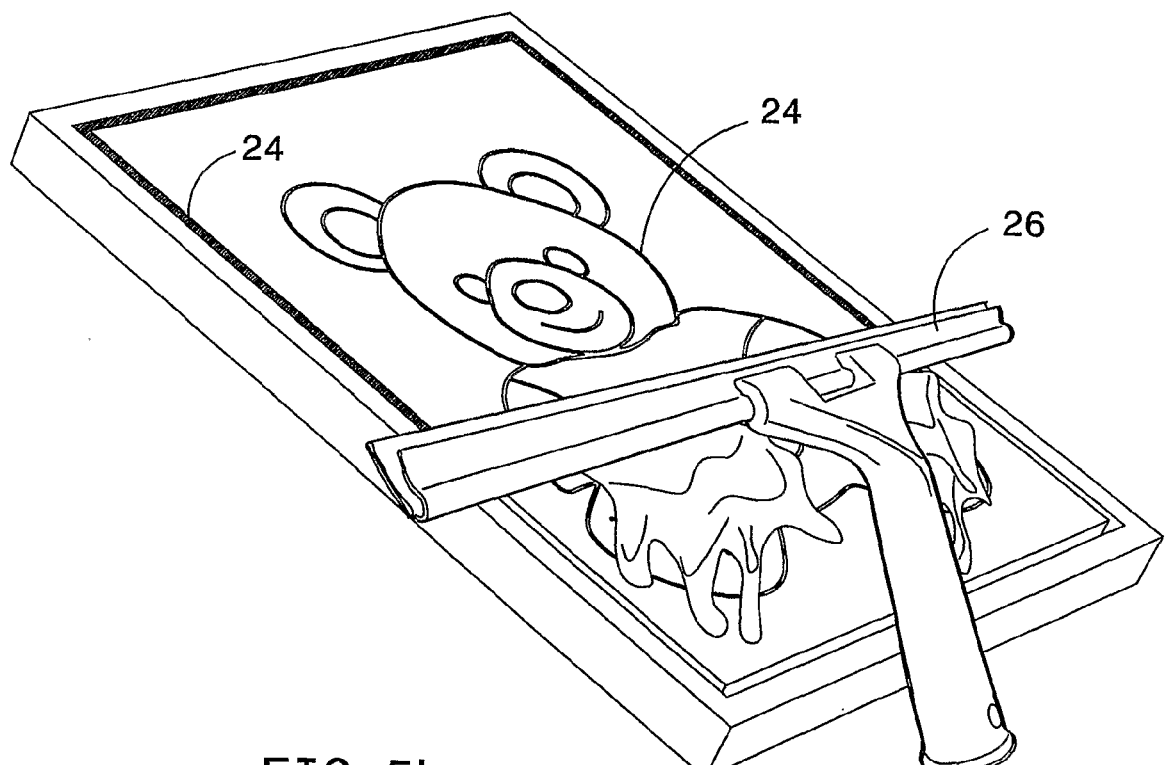
Figure 5C:
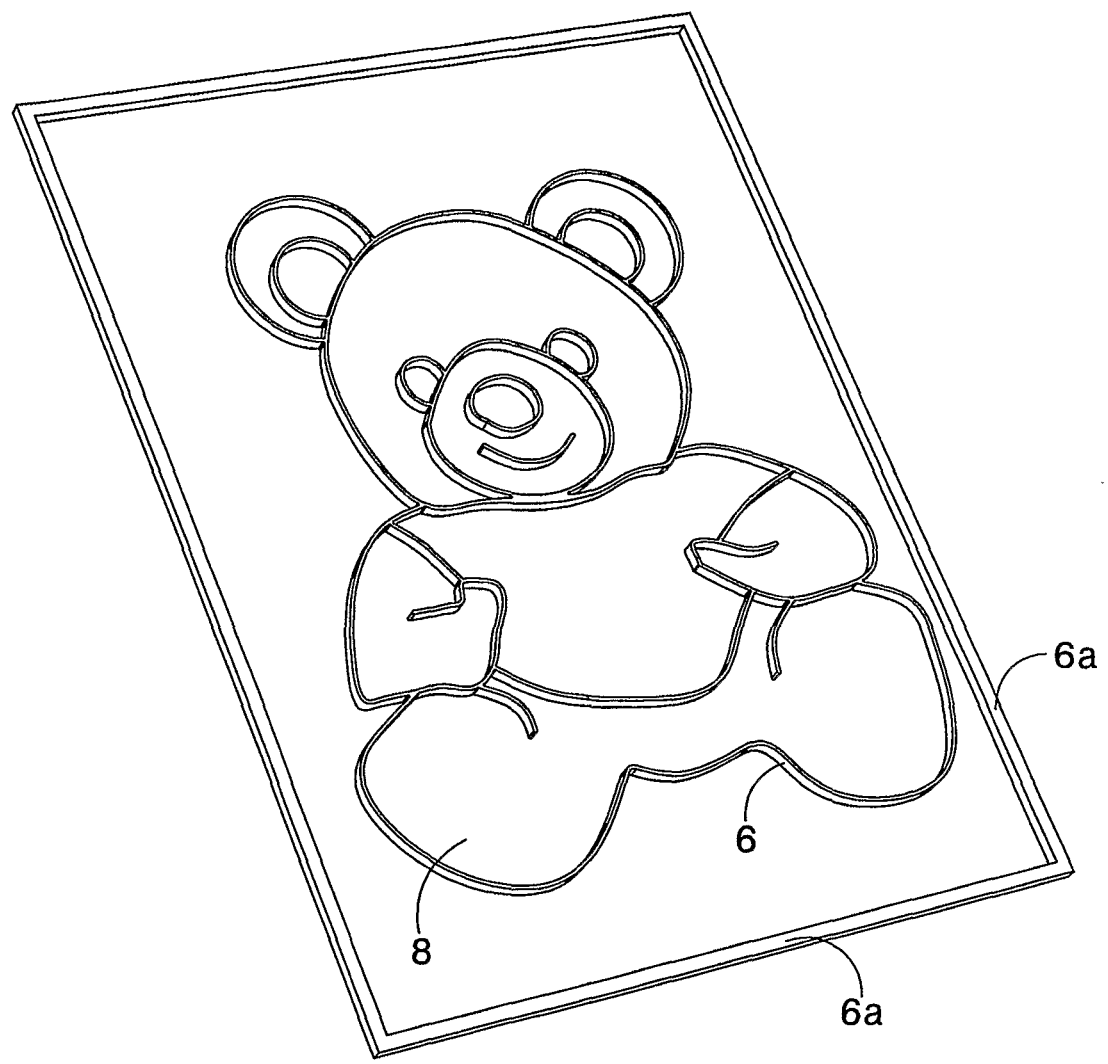

Each of FIGS. 5a to 5c schematically illustrates a step in preparing a contour of solid chocolate, according to one embodiment of the invention.

It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein. Reference numerals may be repeated among the figures in order to indicate corresponding or analogous elements.

DETAILED DESCRIPTION OF PREFERRED EMBODIMENTS

In the following detailed description, numerous specific details are set forth in order to provide a thorough understanding of the invention. However, it will be understood by those skilled in the art that the present invention may be practiced without these specific details. In some instances, well-known methods, procedures, components and circuits have not been described in detail, for the sake of clarity.

Figure 1:
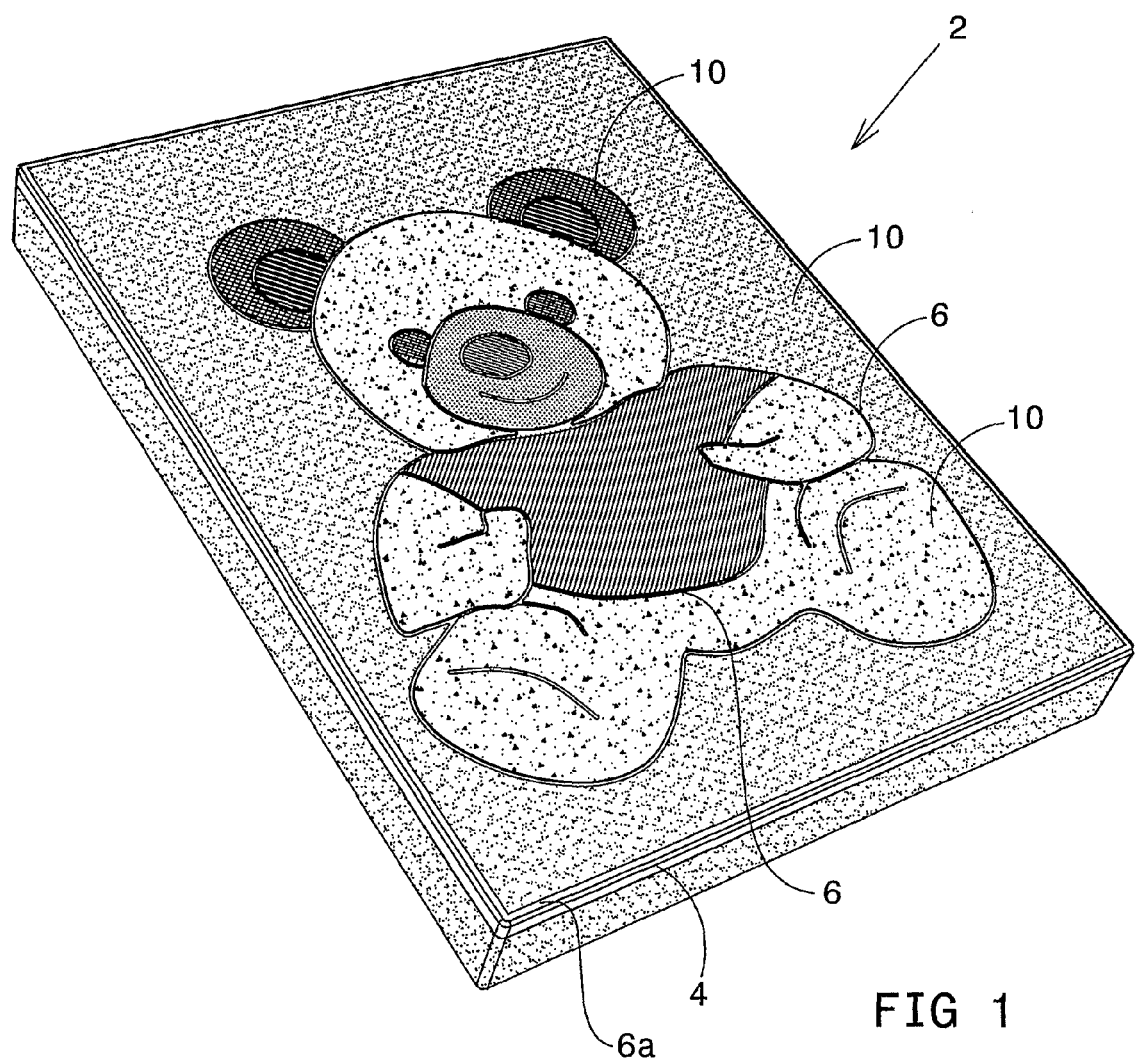
FIG. 1 schematically illustrates a cake, according to one embodiment of the invention.

FIG. 1 schematically illustrates a cake, according to one embodiment of the invention.

The cake, which is marked herein by numeral 2, comprises the figure of a bear. The figure is composed of closed regions 8 (illustrated in FIG. 2), whose contour 6 is made of solid chocolate. One of the objects of the present invention is preparing chocolate contour 6, especially in an industrial manner. Numeral 6a denotes a chocolate frame, which is actually a part of the chocolate contour 6.

Each region 8 can be decorative with a different substance 10, different color of the substance, and so on, resulting in differing colors and flavors. The substance may comprise candies of relatively-small size (e.g., 0.3 mm), cream, ice cream, and so on. For example, the substance filling in the bear's eyes may be blue, that for the bear's nose may be black, the bear's shirt may be green, the legs brown, and so on.

Also illustrated in FIG. 1 is a pan 4.

Figure 2:
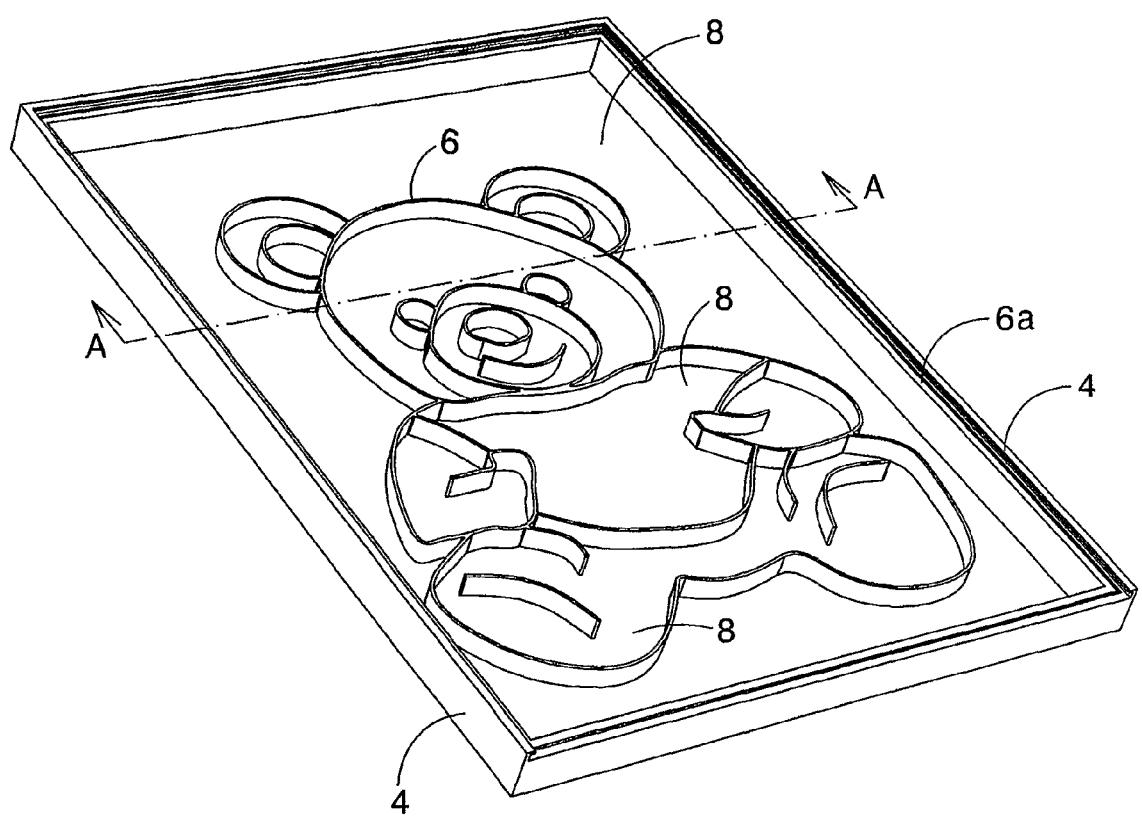
FIG. 2 schematically illustrates a chocolate contour, according to one embodiment of the invention.
Figure 3:
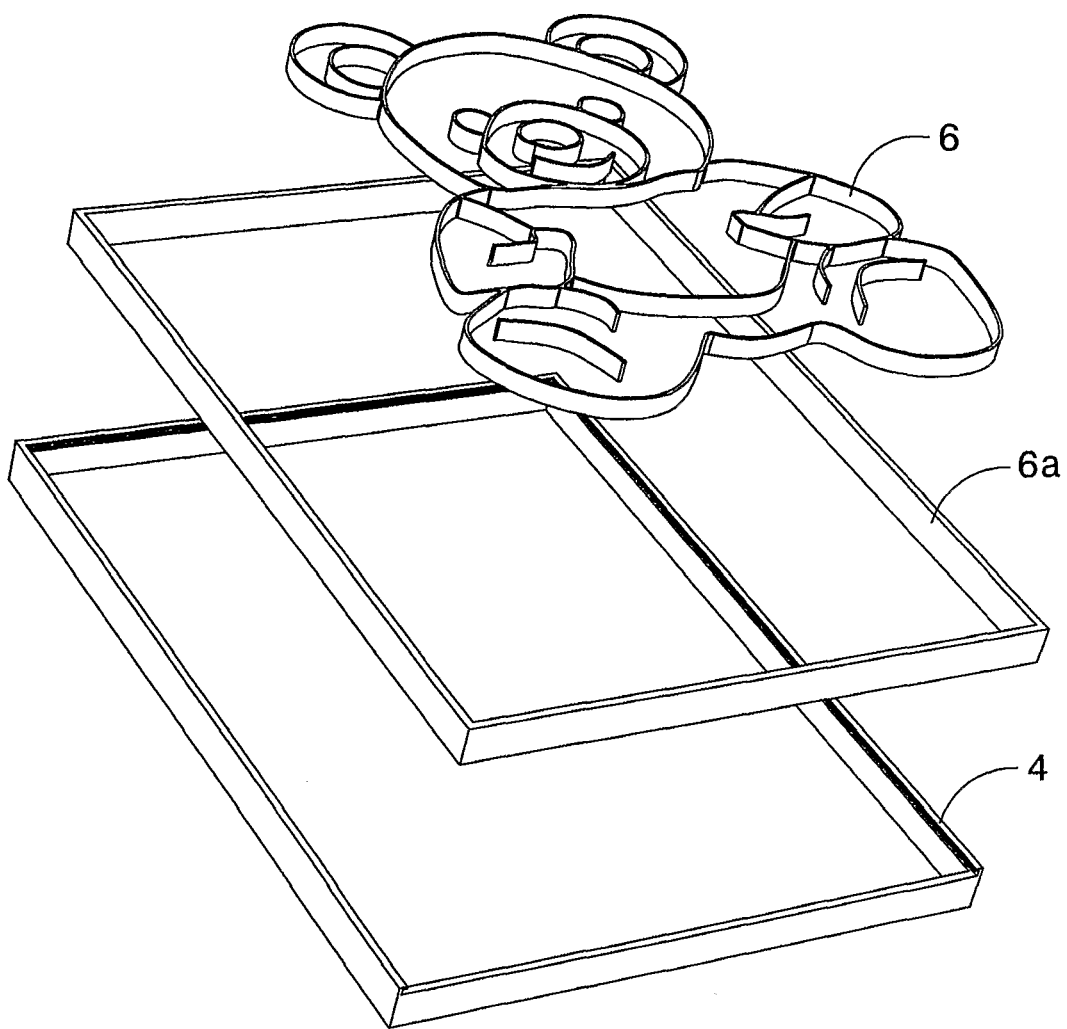
FIG. 3 is an exploded view of the contour illustrated in FIG. 2.

FIG. 2 schematically illustrates a chocolate contour, according to one embodiment of the invention, and FIG. 3 is an exploded view thereof.

The chocolate contour 6 is of a height of a few mm, e.g., 3 mm.

Also defined in FIG. 2 is a cross-section A-A.

Each of FIGS. 4a to 4g schematically illustrates a step in cake preparation, according to one embodiment of the invention. The illustrations are in the form of a cross-section of the cake, as defined in FIG. 2.

Figure 4A:
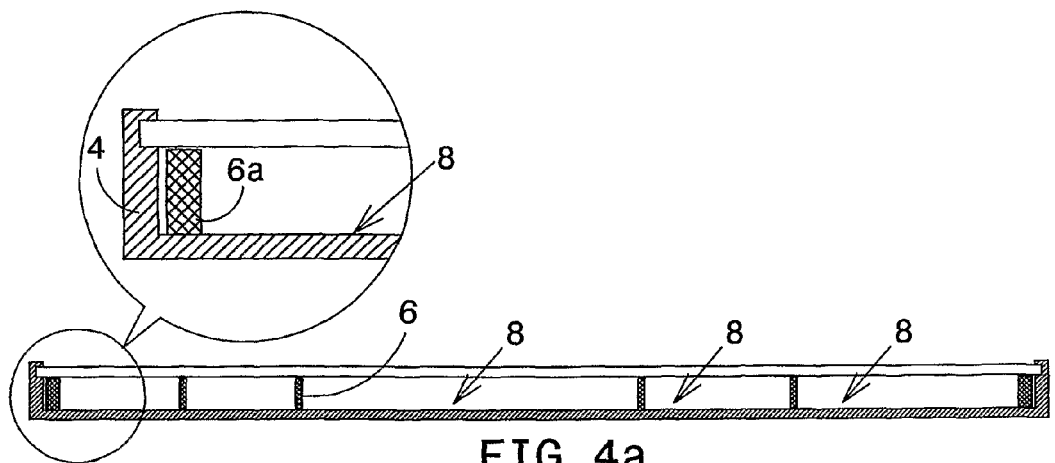
Figure 4B:
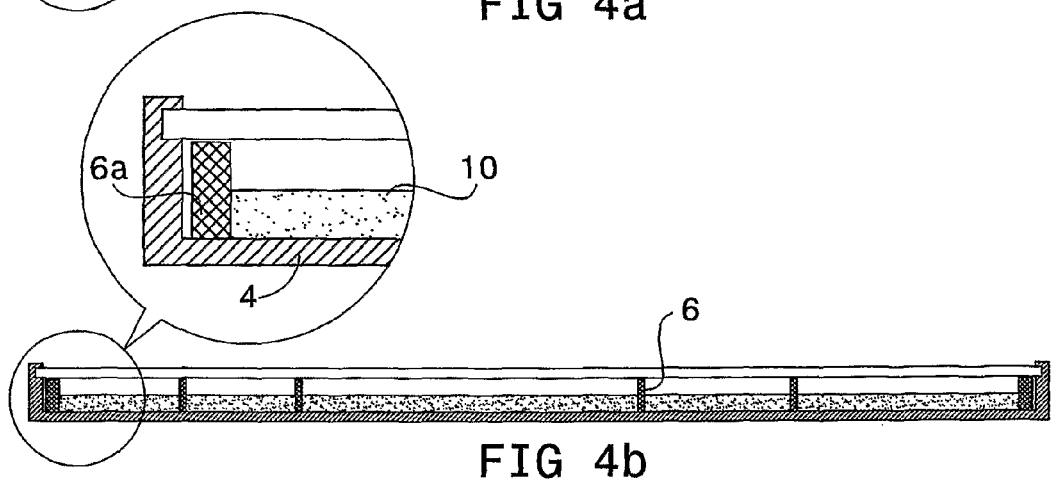
Figure 4C:
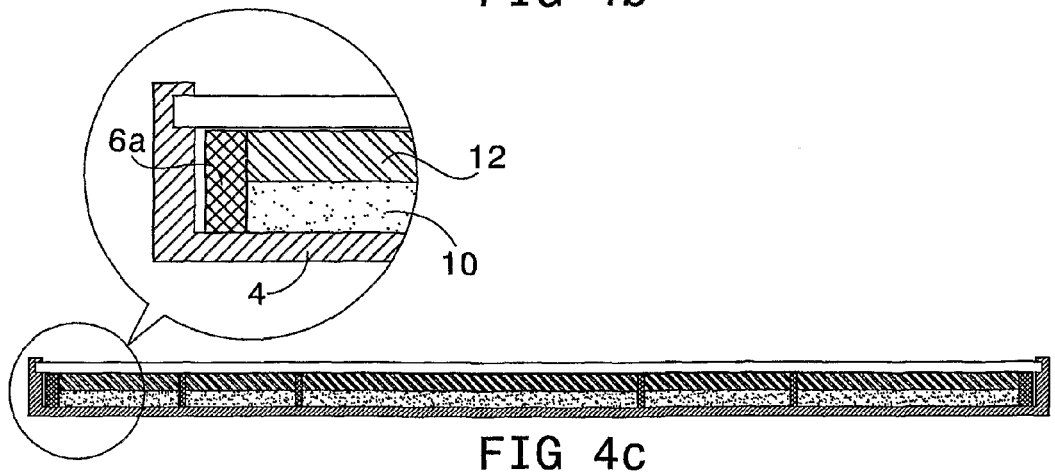

FIGS. 4a to 4c schematically illustrate the steps of preparing a decorative coating, denoted herein by numeral 16. FIGS. 4f to 4g schematically illustrate the steps of placing the decorative coating 16 on a baked substrate 18.

FIG. 4a schematically illustrates the pan 4, in which chocolate contour 6 (and also chocolate frame 6a) is placed.

FIG. 4b schematically illustrates the next step of the cake preparation. In this step, regions 8, confined by chocolate contour 6, are filled with candies 10.

FIG. 4c schematically illustrates the next step of the cake preparation. In this step, hot chocolate dough 12 is poured on the candies filler 10. The hot chocolate pours into the gaps between candies, at least on the upper side of the candies layer. After the hot chocolate cools, it becomes a solid layer. The solid chocolate layer is marked herein by numeral 12a. As mentioned, the entire decorative coating is marked herein by numeral 16.

Figure 4D:
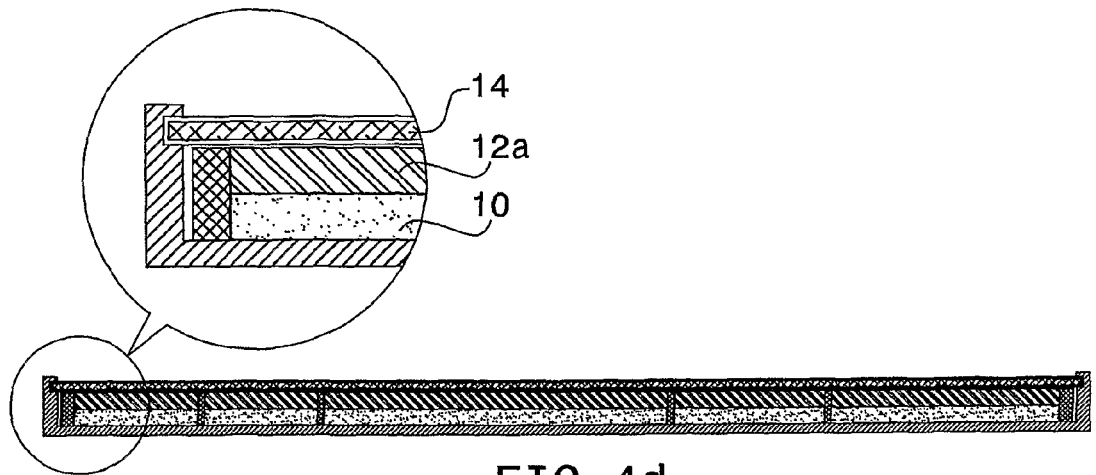

FIG. 4d schematically illustrates the next step of the cake preparation. In this step, pan 4 is covered with lid 14, which makes it possible to turn the pan upside down without disturbing the parts thereof.

Figure 4E:
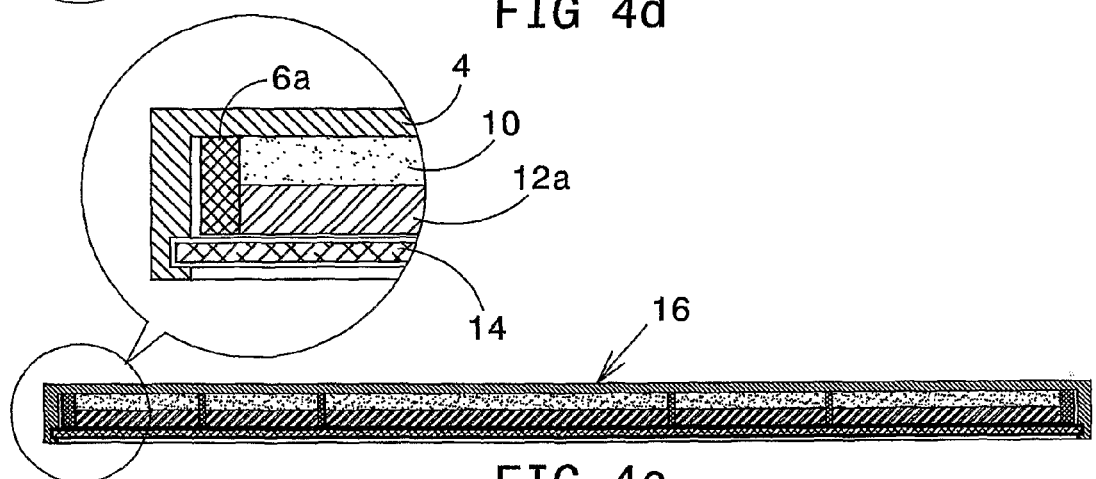
Figure 4F:
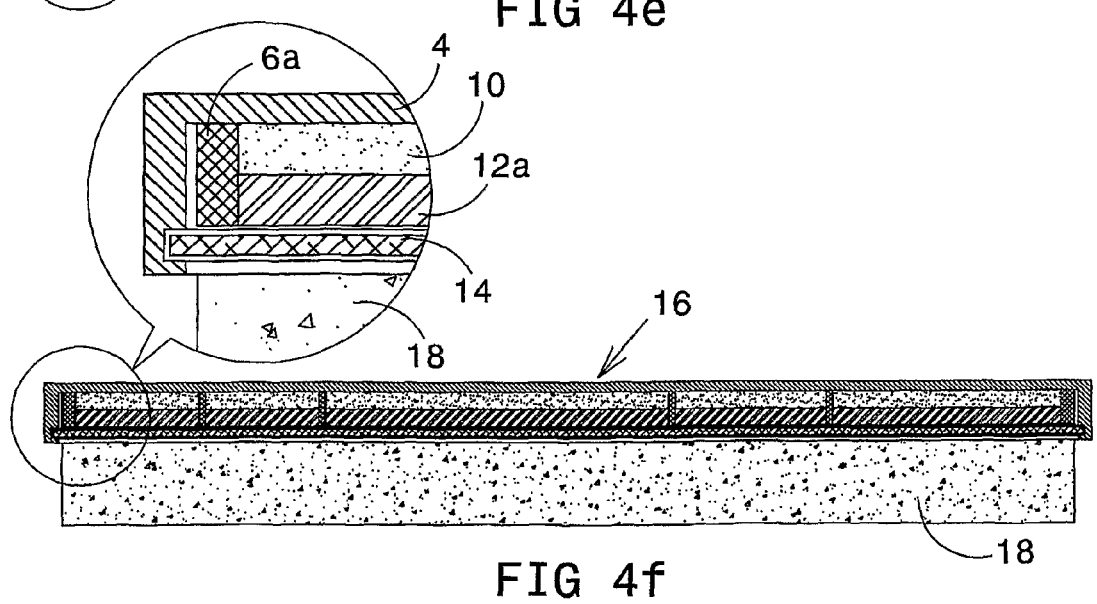
Figure 4G:
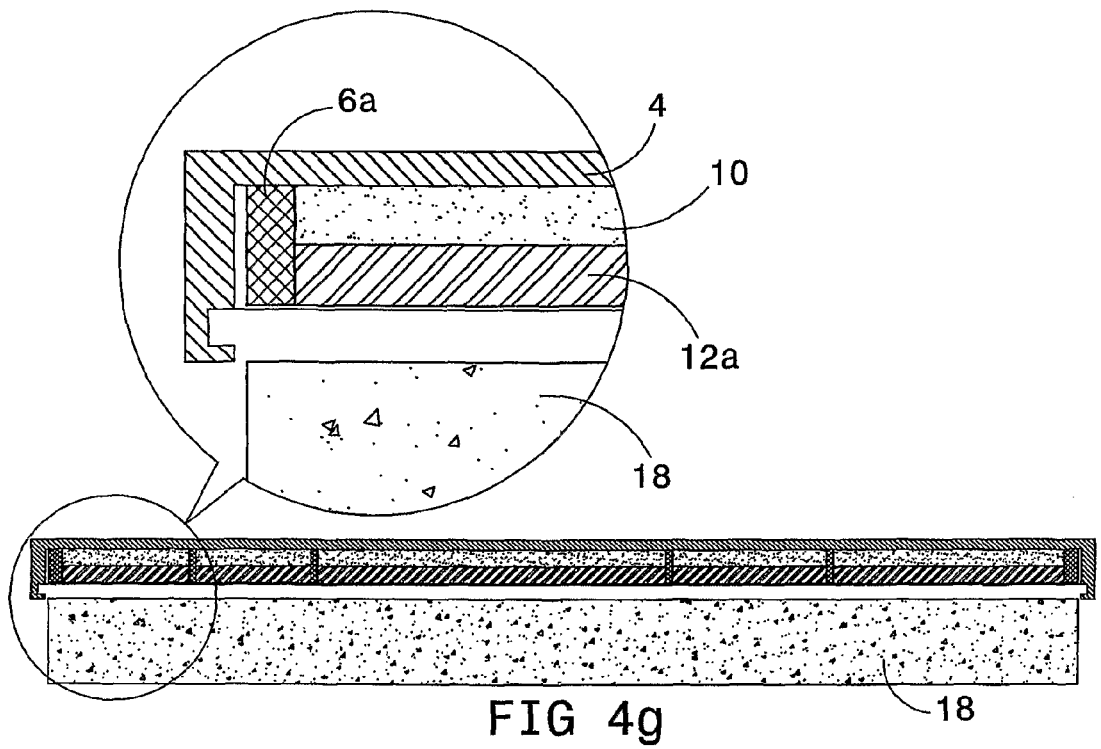

FIG. 4e schematically illustrates the next step of the cake preparation. In this step, pan 4 is turned upside down. In this position, as illustrated in this figure, the bottom of coating 16 is the hardened layer 12a, while the candies are actually deployed at the top of coating 16.

FIG. 4f schematically illustrates the next step of the cake preparation. In this step, pan 4, which stores the prepared coating 16, is placed on a baked substrate 18.

FIG. 4g schematically illustrates the next step of the cake preparation. In this step, lid 14 is removed from pan 4, thereby causing coating 16 to fall onto the cake.

Figure 4H:
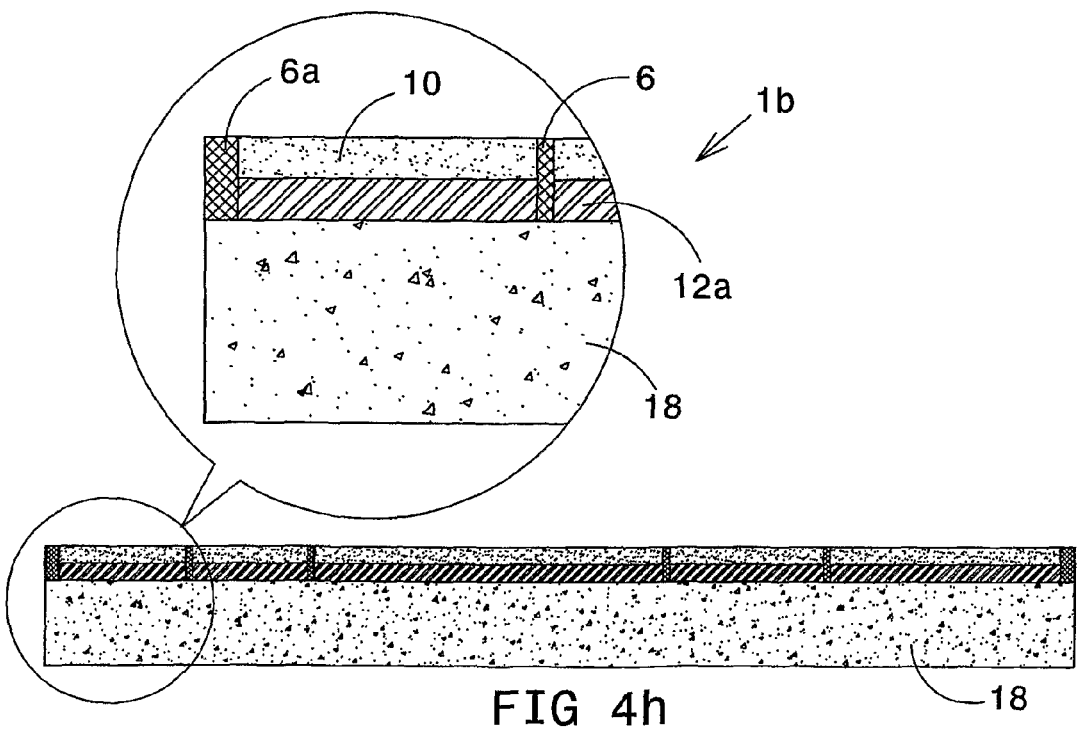

FIG. 4h schematically illustrates the next step of the cake preparation. In this step, pan 4 is removed, thereby bringing the preparation to its end.

Each of FIGS. 5a to 5c schematically illustrates a step in preparing a contour of solid chocolate, according to one embodiment of the invention.

The preparation of the contour is suitable for both industrial and domestic use.

According to this embodiment of the invention, the chocolate contour, marked in the figures herein by numeral 6, is prepared using a mould 20 comprising slots 22, which correspond to the negative image of the contour. The mould is made of non-toxic material, such as foamed plastic.

In FIG. 5a, chocolate dough 24 (which may be also hot chocolate) is poured on mould 20, thereby filling slots 22 with the chocolate dough.

In FIG. 5b, the excess of chocolate dough 24 is "wiped" using a wiper (squeegee) 26. Then the mould is cooled, thereby causing chocolate dough 24 to harden in slots 22.

In FIG. 5c, mould parts are removed, resulting in a chocolate contour 6 (including the chocolate frame 6a), ready for coating preparation, as illustrated and explained in FIGS. 1 to 4h.

The whole process may be carried out using a pan. However, for the sake of brevity, the pan is not illustrated in FIGS. 5a to 5c.

The examples herein refer to a chocolate contour. However, it should be noted that the contour can be of any edible substance which has a fluid state of aggregation and a solid state of aggregation, wherein the solidification takes place at room temperature, placing in a refrigerator, and the like.

Greasing

Since the cake coating may stick to the pan, greasing means such as a grease-proof paper, a grease layer, and the like may be used for preventing the sticking. For example, a grease-proof paper may be disposed between pan 4 and the chocolate contour 6. Alternatively, the pan may be smeared with a greasy substance (such as margarine) before placing the chocolate contour thereon.

A grease layer may be used also for allowing separation of the chocolate contour 6 from mould 20 in an easy manner. In this case, before filling slot 22 with hot chocolate, the slot has to be smeared with a grease layer.

PARTS LIST

In the drawings and/or description herein, the following numerals have been mentioned:
- numeral 2 denotes a cake, according to one embodiment of the invention;
- numeral 4 denotes a pan, such as a baking pan;
- numeral 6 denotes a contour of hardened chocolate;
- numeral 6a denotes a chocolate frame;
- numeral 8 denotes a closed region confined by chocolate mould 6;
- numeral 10 denotes a candies filling;
- numeral 12 denotes chocolate dough;
- numeral 12a denotes a filling of solid chocolate;
- numeral 14 denotes the lid of pan 4;
- numeral 16 denotes a cake coating, according to one embodiment of the invention;
- numeral 18 denotes a baked substrate;
- numeral 20 denotes a mould for preparing a chocolate contour;
- numeral 22 denotes a slot corresponding to the contour of the figure;
- numeral 22a denotes a slot corresponding to the contour of the frame;
- numeral 24 denotes chocolate dough; and
- numeral 26 denotes a wiper (squeegee).

While certain features of the invention have been illustrated and described herein, the invention can be embodied in other forms, ways, modifications, substitutions, changes, equivalents, and so forth. The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A method for decorating a cake with a cake coating wherein the method comprises the steps of:
    producing a solid edible figure contour having an open top face and an open bottom face, wherein producing said solid edible figure comprises the steps of:
        (a) providing a non-toxic mould for preparing said solid edible figure contour and placing said mould into a pan, wherein said mould has an open top face and an open bottom face and is formed with at least one slot having a depth of 2 mm or greater, wherein said at least one slot outlines the shape of said solid edible figure contour, and wherein the mould further comprises a slot that produces a frame that surrounds the solid edible figure contour;
        (b) pouring a solidifying first edible substance into said at least one slot and said slot that produces a frame;
        (c) wiping off the excess of said solidifying first edible substance using a wiper and allowing the first solidifying substance to harden thereby producing said solid edible figure contour surrounded by a solid edible frame;
        (d) separating said solid edible figure contour and said solid edible frame from within said non-toxic mould, wherein said solid edible figure contour defines at least one void, and placing said solid edible figure contour and said solid edible frame on a second pan;
    filling said at least one void of said solid edible figure contour and a void between said solid frame and said solid edible figure contour with a layer of a second edible pourable substance comprising multiple colors of candies, thus forming a colorful figure;
    pouring a binding solidifying third edible substance onto said solid edible figure contour, said solid edible frame and onto said layer of second edible substance, wherein the third edible substance is allowed to form a hardened solid layer covering said solid edible figure contour, said solid frame and said layer of second edible substance and gaps there between, thereby producing a hardened solid coating comprising said first, second, and third edible substance;
    placing a lid on top of said hardened solid coating;
    turning said hardened solid coating that has been placed on the lid upside down, such that said lid is under said hardened solid coating, and wherein said colorful figure is thereby revealed showing said solid edible figure contour as the outline of said colorful figure; and
    placing said hardened solid coating having said colorful figure on a cake by sliding said figure off of said lid and removing said second pan, thereby providing a cake coating having an edible colorful figure.

2. A method according to claim 1, wherein said first solidifying edible pourable substance comprises chocolate.

3. A method according to claim 1, wherein said third binding, solidifying edible substance comprises chocolate.

4. A method according to claim 1, wherein the height of said frame is between about 5 mm and 7 mm.

5. The method of claim 1, wherein said placing of said solid edible figure contour on said second pan comprises placing a grease layer between said solid edible figure contour and said second pan.

6. A method according to claim 5, wherein said grease layer is selected from a group consisting: a grease-proof paper, and margarine.

7. The method of claim 1, wherein the third edible substance solidifies at room temperature or a refrigerator temperature.

8. A method according to claim 1, wherein said mould further comprising a grease layer, for enabling easy separation of said edible figure contour from within said mould.

9. A method according to claim 1, wherein said non-toxic substance comprises foamed plastic.

* * * * *